United States Patent

Pfouts et al.

[11] Patent Number: 4,759,401
[45] Date of Patent: Jul. 26, 1988

[54] THREE FLUID HEAT EXCHANGER FOR COOLING OIL AND AIR WITH FUEL

[75] Inventors: Robert R. Pfouts, Dayton; John E. Wunder, Kettering; William Nostadt, Jr., Vandalia, all of Ohio

[73] Assignee: Parker-Hannifin Corporation, Cleveland, Ohio

[21] Appl. No.: 870,434

[22] Filed: Jun. 4, 1986

Related U.S. Application Data

[62] Division of Ser. No. 676,500, Nov. 29, 1984, Pat. No. 4,620,588.

[51] Int. Cl.[4] .................. G05D 23/00; F28F 27/02; F02C 7/06; F02G 3/00
[52] U.S. Cl. ................................ 165/51; 60/39.08; 60/736; 184/6.4; 184/6.11
[58] Field of Search ................. 60/39.08, 736; 184/6.11, 6.4; 165/140, 145, 47, 51

[56] References Cited

U.S. PATENT DOCUMENTS

| | | | |
|---|---|---|---|
| 573,111 | 12/1896 | Shepard | 165/140 |
| 2,487,842 | 11/1949 | Whiteman et al. | 60/39.08 |
| 2,731,239 | 1/1956 | Andersen | 60/39.08 |
| 2,925,712 | 2/1960 | Johnson et al. | 60/39.08 |
| 2,970,437 | 2/1961 | Andersen et al. | 60/39.08 |
| 3,080,716 | 3/1963 | Cummings et al. | 60/736 |
| 3,779,345 | 12/1973 | Barnes et al. | 184/6.11 |
| 3,991,823 | 11/1976 | Litke et al. | 165/145 |
| 4,041,697 | 8/1977 | Coffinberry et al. | 60/736 |
| 4,151,710 | 5/1979 | Griffin et al. | 60/39.08 |
| 4,284,174 | 8/1981 | Salvana et al. | 184/6.4 |
| 4,546,605 | 10/1985 | Mortimer et al. | 184/6.11 |

FOREIGN PATENT DOCUMENTS

| | | | |
|---|---|---|---|
| 0112317 | 9/1978 | Japan | 60/39.08 |
| 736017 | 8/1955 | United Kingdom | 60/39.08 |
| 2058958 | 4/1981 | United Kingdom | 184/6.4 |
| 0731170 | 5/1980 | U.S.S.R. | 60/39.08 |
| 1092353 | 5/1984 | U.S.S.R. | 165/145 |

Primary Examiner—Albert W. Davis, Jr.
Assistant Examiner—John K. Ford
Attorney, Agent, or Firm—J. E. Beringer

[57] ABSTRACT

A three fluid heat exchanger in which first (fuel) and second (oil) fluids are in a normally flowing heat transfer relation, with flow of a third fluid (compressor bleed air) being dependent on a changing condition of one of the first or second fluids. Tubular heat exchanger cores are comprised in a unitary body with one being perpendicular to the other for space conservation and to simplify fluid flow patterns. The described one core is in the path of flow of one of the first or second fluids and provides a flow path for the third fluid. A valve influenced by a changing pressure condition of one of the first and second fluids controls flow of the third fluid.

5 Claims, 2 Drawing Sheets

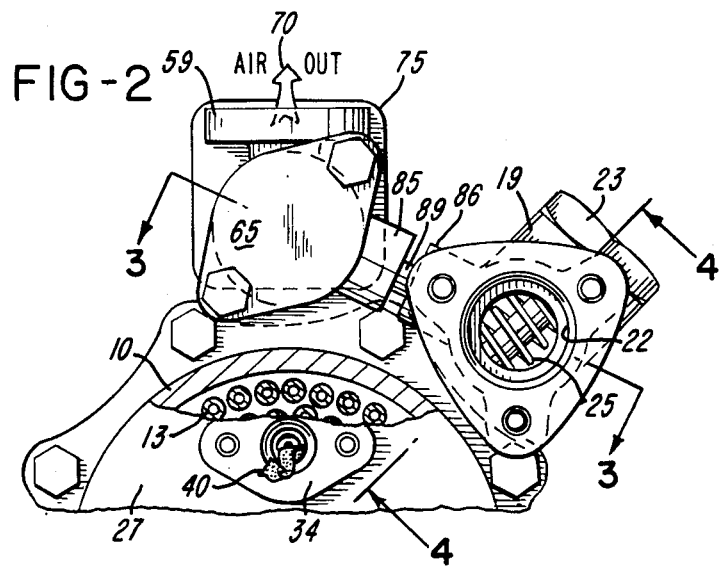
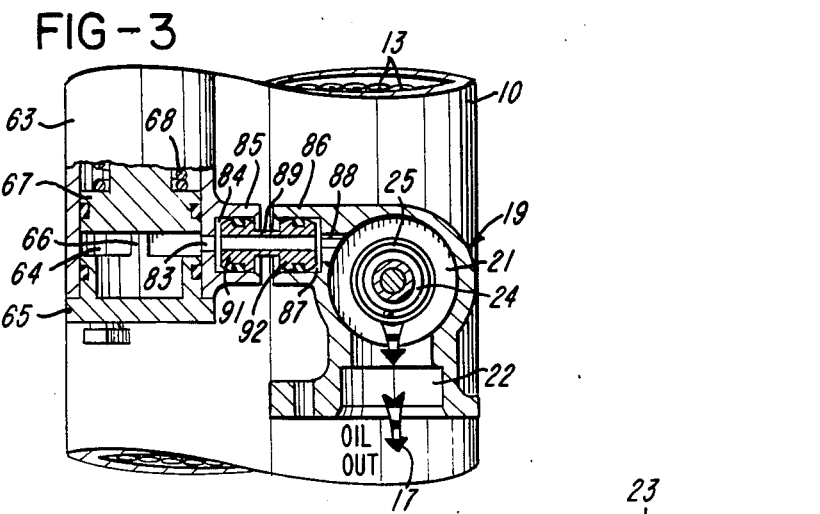
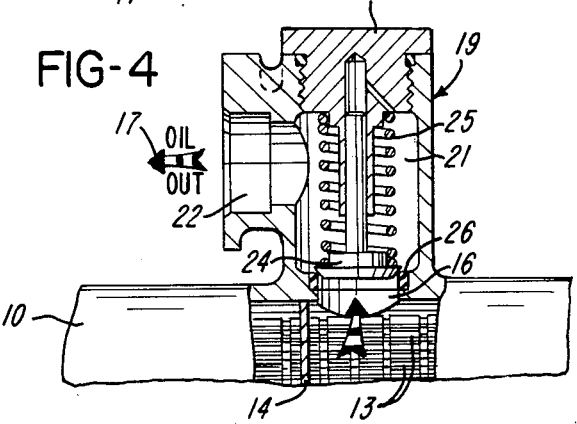

THREE FLUID HEAT EXCHANGER FOR COOLING OIL AND AIR WITH FUEL

This is a division of co-pending application Ser. No. 676,500, filed on 11/29/84, now U.S. Pat. No. 4,620,588.

BACKGROUND OF THE INVENTION

1. Field of the Invention

This invention relates to three fluid heat transfer apparatus, and particularly to unitary heat exchangers comprising plural heat exchanger cores encountered successively by at least one of the flowing fluids.

2. Description of the Prior Art

Heat transfer apparatus incorporating plural heat exchanger cores have been known heretofore. The routing of fluid flow to and through the cores has been relatively complex, however, and in a structural sense the apparatus tends to assume component form. In some instances, as in aircraft engine accessories and the like, there are advantages to be gained in unitary compact constructions not attainable by use of separate, variously connected component parts. Moreover, a grouping of heat exchanger cores in an in-line relation may result in an elongated structure not adaptable to the physical environment in which it is to be used. It is, still further, desirable when the flow of one fluid is to be controlled by reference to a changing condition of another fluid that elements be in a close coupled relation for quick and simplified response.

To the extent that efforts have been made to remedy problems of the prior art, such efforts have had limited success. It has been particularly noted that in design requirements for a system making alternative use of flowing fuel as a coolant for engine cooling oil and as a coolant for engine cooling air known technology was found insufficient to meet those requirements.

SUMMARY OF THE INVENTION

This invention presents three fluid heat transfer apparatus in the form of a device which can be unitarily handled and installed as an engine or like accessory. The device incorporates a pair of heat exchanger cores which with respect to one fluid are in a series relation and within which the described one fluid is in heat transfer relation to respective ones of the other fluids. In the disclosed instance, the heat exchanger cores are of the tubular type and orient perpendicularly of one another for a construction shorter in length than would otherwise be possible. At the same time, a valve positioned to control flow of one of the other fluids can be closed coupled for sensing of a changing condition of the other of the described other fluids. In a particular application of the unitary device it is connected in engine oil and fuel flowing lines and in a duct communicating with engine bleed air, with all connections being effected within the device and the sensing of the changing condition of one of the fluids being accomplished by a simple crossover connection. In such particular application, fuel is the fluid common to the two cores and flows through the tubes of a first core and over and around the tubes of a second core. The arrangement allows maximum fuel flow with only that amount of heat transfer surface used in the second case as may be required to achieve the desired cooling effect.

An object of the invention is to provide a three fluid heat exchanger substantially as in the foregoing.

Other objects and structural details of the invention will appear from the following description when read in connection with the accompanying drawings, wherein:

FIG. 2 is a fragmentary view in cross section, taken substantially along the line 2—2 of FIG. 1;

FIG. 3 is a transverse sectional view taken substantially along the line 3—3 of FIG. 2; and FIG. 4 is a detail sectional view taken substantially along the line 4—4 of FIG. 2.

Figure 1:
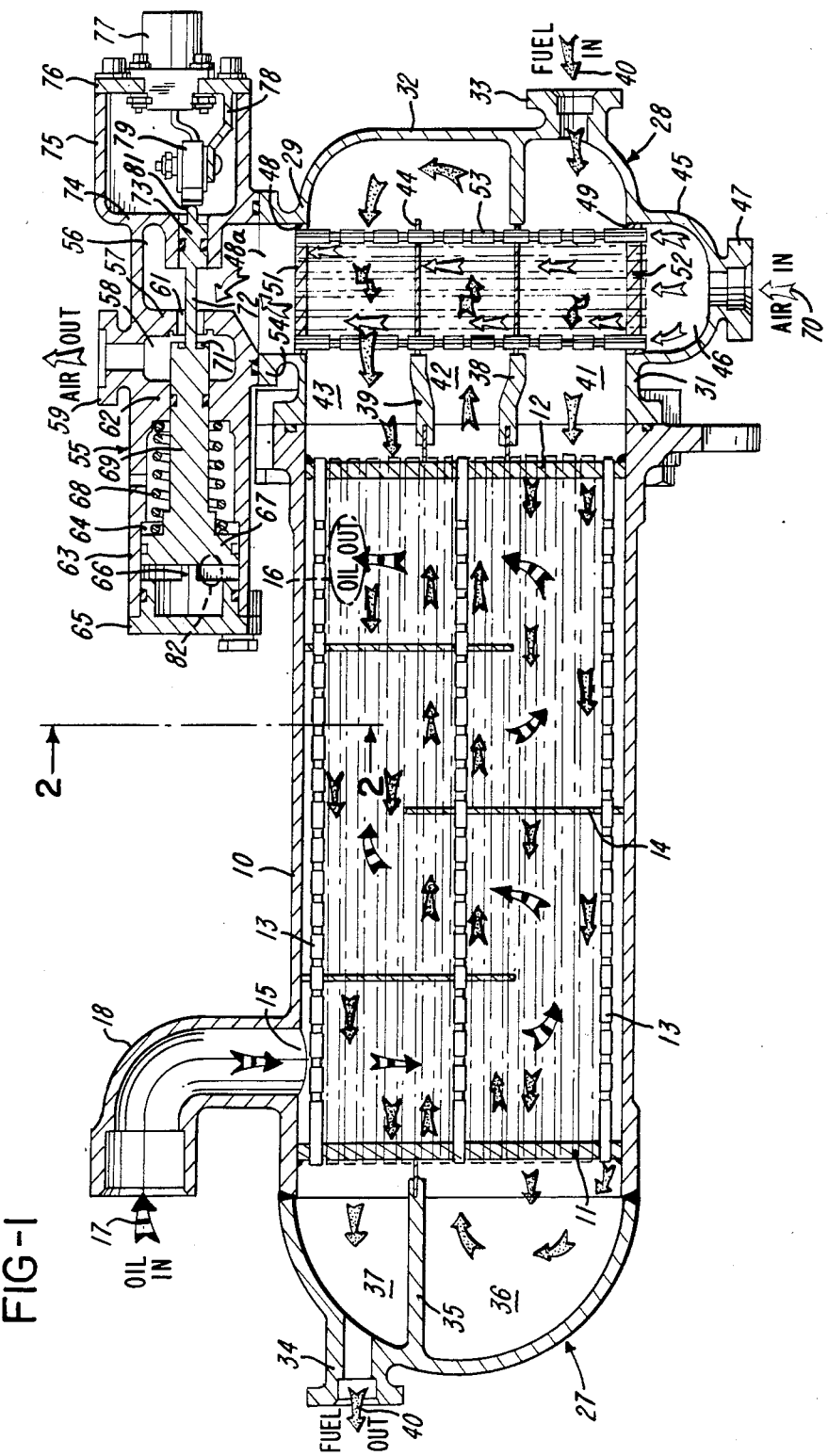
FIG. 1 is a view in longitudinal section, and partly diagrammatic, of a heat exchanger in accordance with an illustrated embodiment of the invention.

Referring to the drawings, a heat exchanger according to the illustrated invention embodiment is useful as an engine accessory, particularly an accessory in a gas turbine engine environment, a by-product of the operation of which is compressor bleed air. Installed as a unit in the engine environment, the heat exchanger is connected in lines flowing engine lubricating oil, engine fuel and compressor bleed air. In a normal operating function, flowing fuel is used to cool recirculated engine oil which has absorbed heat in its passage through the engine. The compressor bleed air, which acts as an alternative cooling medium, is normally denied flow through the heat exchanger, in the interest of an economical use of such air. Should the oil system fail, however, sensing mechanism opens a path of flow for the bleed air, which, in passing through the heat exchanger is cooled by the flowing fuel.

The heat exchanger comprises a generally cylindrical body or shell 10, within which is a tubular heat exchanger core made up of longitudinally spaced apart header plates 11 and 12 and interconnecting tubes 13. Occupying longitudinally spaced apart locations within the core are segmental baffles 14. Near one end of the core, in the body 10, is an oil inlet opening 15. Near the opposite end of the core, in the body 10, is an oil outlet opening 16. Oil flowing under pressure and admitted to the body 10 at inlet 15 is compelled by baffles 14 to move toward outlet 16 in a serpentine path taking it repeatedly over and between the tubes 13. The oil flow path within the body is indicated by the arrows 17. An inlet fitting 18 rises from inlet 15. An outlet fitting 19 (FIG. 4) rises from outlet 16. The latter includes a chamber 21 into which outlet 16 opens and a laterally directed outlet port 22. An upper end of chamber 21 is closed by a plug 23 providing a sliding mount for a check valve 24. A compression spring 25 urges valve 24 to engage a valve seat 26 surrounding opening 16. Under conditions of normal oil pressure, the valve 24 is lifted from seat 26 by the discharging oil which exits the fitting 19 by way of port 22. Should oil pressure drop to a value insufficient to deflect spring 25, valve 24 closes, preventing an outflow of the oil contained in body 10 as well as reverse flow through port 22.

That end of body 10 nearer oil inlet fitting 18 is closed by a dome manifold 27. The opposite end of the body is closed by a relatively extended manifold 28. The latter includes generally opposed side walls 29 and 31, constituting extensions of body 10, and an end wall 32. In the end wall 32 is a fitting 33 for the inflow of fuel to the manifold interior. In the wall of dome 27 is a fitting 34 for the outflow of fuel. An internal rib 35 in dome 27 divides the dome interior into a lower closed chamber 36 and an upper chamber 37 communicating with outlet fitting 34. A plate-like baffle 38 extends from rib 35 to header 11 and obviates direct communication between the chambers 36–37.

In the end manifold 28 are internal ribs 38 and 39 which, with appropriate baffle plates, define interior manifold chambers 41, 42 and 43, the latter two of which communicate with one another around a baffle plate 44. Fuel inlet fitting 33 opens into chamber 41. A portion of the bundle of tubes 13 communicates with chamber 41 and conducts incoming fuel, as indicated by arrows 40, to chamber 36 where it is free to reverse its path and return through another tube bundle portion to chamber 42. Flowing then around baffle plate 44 to chamber 43 the fuel is conducted again to dome 34, by way of still another tube bundle portion, where it enters chamber 37 and exits the heat exchanger through outlet fitting 34. Accordingly, the fuel makes multiple passes through the bundle of tubes 13, and, while in the tubes, is in a heat transfer relation to oil flowing over and around the tube exteriors. The fuel, being relatively cool, absorbs heat from the oil which is thereby recirculated to the engine conditioned for effective lubrication and cooling.

The body extension manifold 28 has a protuberant portion 45 defining a chamber 46. An air inlet fitting 47 is connected to conduct compressor bleed air to the chamber 46. Opposing walls 29 and 31 of the extension manifold 28 have aligned apertures 48 and 49 respectively, the latter of which opens into chamber 46 and the former of which may be regarded as the air outlet. Installed in such openings are respective header plates 51 and 52 interconnected by flow tubes 53. Plates 51 and 52 and tubes 53 comprise a second heat exchanger core. The tubes 53 communicate at their one ends with chamber 46 and at their opposite ends with an extended passage portion 48a of aperture 48 opening through and beyond wall 29.

Portion 48a is comprised in an upstanding boss 54 on wall 29 flanged to provide a seat for a valve body 55. In the body 55, a chamber 56 overlies and communicates with passage portion 48a. A body wall 57 separates chamber 56 from a chamber 58 communicating with an air outlet fitting 59. In the wall 57 is a port 61. The body 55 is extended in one direction from the inlet fitting 59 to include a bearing wall portion 62, and, beyond that, a cylindrical portion 63. An outer end of the portion 63 is closed by a cap 65, an inner end of which has projecting fingers 66. A piston 67 is slidable in chamber 64 and is urged by a confined compression spring 68 in a direction away from wall 62, in which movement it is limited by fingers 66. A rod portion 69 extends axially from piston 67 and has a sliding bearing in wall 62. The rod portion terminates in chamber 58 and is formed at its extremity as a valve 71. Valve 72 is adapted to seat to and to retract from wall 57 respectively to close and to open port 61. In an open position, as illustrated and as indicated by arrows 70, air admitted to chamber 46 can enter and flow through tubes 53, discharge into valve chamber 56 and have access through port 61 and chamber 58 to outlet fitting 59. In a closed position of the valve, air flow through the valve body and thereby through the heat exchanger core tubes 53 is denied.

Piston rod 69 has a reduced diameter axial extension 72 which projects through port 61 into and through chamber 56. Extension 72 terminates in a larger diameter piston portion 73 slidingly received in a body wall 74 which in part defines the chamber 56. The body 55 is extended in the opposite direction from outlet fitting 59, that is oppositely of cylindrical portion 63, to include the wall 74 and further to include a housing portion 75. A cap 76 closes an outer end of housing portion 75 and mounts an electrical fitting 77. Further, an integral shelf 78 on cap 76 extends into the housing interior and mounts a switch 79. The switch 79 positions adjacent to and in line with valve portion extension 73 which has a nose portion 81 for switch actuation. Switch 79 is connected through fitting 77 in an electrical signalling circuit to give remote indication of the operating position assumed by valve 71.

The valve piston 67 is influenced in its movements by spring 68 and by oil pressure admitted to chamber 65 between the piston and closure 65. An oil inlet opening 82 appears in the cylindrical body portion 63 substantially in the the transverse plane occupied by fingers 66. Indicated diagrammatically in FIG. 1 only, opening 82 is seen more particularly in FIG. 3 to include a port 83 in the bottom of a recess 84 in an upstanding boss 85. Boss 85 positions oppositely of a similar boss 86 projecting from the before mentioned oil outlet fitting 19. In the boss 86 is a recess 87 and in the bottom of recess 87 is a port 88 opening into chamber 21 of the oil outlet fitting. A transfer tube 89 interconnects the bosses 85-86. At respective ends of the tube 89 are bulbous heads 91 and 92 received in respective recesses 84 and 87 with freedom of relative rocking motion and some longitudinal motion. The oil outlet pressure accordingly is transmitted from chamber 21 of the heat exchanger body 10 to chamber 64 of the valve body 55 by way of transfer tube 89 and at a location to be applied to piston 67 in opposition to spring 68. The freedom of adjustment of the transfer tube allows simplified assembly despite slight misalignment as may result from tolerance excesses. A close coupled relationship between the heat exchanger and valve body is established and is maintained irrespective of installational and operational stresses.

From the foregoing description, the operation of the disclosed heat transfer apparatus will be largely self evident. Briefly, however, the structure allows or affords continuous flow of oil and fuel, which fluids are in a heat transfer relation to one another within the first heat exchanger core or that comprising the bundle of tubes 13. The fuel, in travelling its circuituous route from inlet fitting 33 to outlet fitting 34, passes successively through manifold extension chambers 41-43. These chambers are intersected by the second heat exchanger core or that comprising the bundle of tubes 53. The flowing fuel accordingly makes repeated passes over the tubes 53 and is in a heat transfer relation to the flowing air, if any, within the tubes. Under normal operating conditions, the pressure of the flowing oil, as transmitted by transfer tube 89 from the oil outlet chamber 21 to the valve piston chamber 64, is effective to overcome spring 68 and seat valve 71 to wall 57, closing port 61. There is accordingly at this time no air flow through tubes 53 and the described second heat exchanger core is not a factor in system operation. Switch 79 is activated by nose portion 81 to provide appropriate remote indication of operating conditions.

The pressure of the recirculated oil is normally relatively high, that is, high enough for full flow over and around the bundle of tube 13 and high enough to deflect check valve 24 and to seat valve 71 in a port closing position.

If, as a result of damage, equipment malfunction or the like, the oil pressure drops below that required to maintain full flow through the described first heat exchanger core, the lowering pressure is sensed in valve body chamber 64. At some lowered pressure value, the pressure in chamber 64 becomes inadequate to oppose spring 68 and valve 71 is retracted to an open position as shown in FIG. 1. The flow path for compresor bleed air is so opened and air passes through tubes 53 toward outlet fitting 59, being in the process exposed to a heat transfer relation to fuel making lateral passes over and around the tubes. Flowing air is cooled by the flowing fuel, and, downstream of the heat exchanger, may assume cooling functions normally performed by the flowing oil. Should oil pressure be restored, this is automatically sensed in chamber 64 and valve 71 is closed.

The described first and second heat exchanger cores are in a perpendicular relation to one another. The described second such core is, moreover, fully contained within manifold extension 28 closely adjacent to the described first heat exchanger core. A compactness of structure is so achieved helpful to installation and use of the apparatus. The need for extended flow lines in obviated and disadvantages inherent in multiple component usage are avoided.

A particular relationship between the fuel-oil-air fluids has been described for illustration purposes. It is obvious, of course, that other relationships are possible, for example one in which the device functions as a fuel heater, with oil and compressor bleed air being alternative heating fluids. Also, the device has broad application as a three fluid heat exchanger without limitation as to particular systems and fluids. The fluids could be all gases or all liquids or combinations of the two. Further, the route here shown as taken by compressor bleed air could be an alternative route for the oil, normally closed but to be opened automatically in the event of failure in the main oil flow route.

A use of separate heat exchanger cores, permits a use of tubes 13 and tubes 53 of different material when this may be desirable, as when tubes 53 may be exposed over a protracted period to the high temperature bleed air. Further, since the tubes 53 are not required to accommodate fuel flow through their interiors, they can be made relatively small in number to provide only that amount of heat transfer surface needed for cooling of the bleed air to the extent desired.

What is claimed is:

1. A three fluid heat exchanger, in a gas turbine engine environment in which cooled lubricating oil cools engine bearings and in which cooled compressor bleed air has a utility as a temporary substitute for cooled oil in the event of a loss of system oil pressure, the heat exchanger presenting first and second sections accommodating a movement of flowing fuel acting as a coolant, one of said sections having means providing a path for heated oil to flow in heat transfer relation to the relatively cooler fuel and the other having means providing a path for heated compressor bleed air to flow in heat transfer relation to the fuel, means containing said heat exchanger sections in a unitary structure including means providing for a continuing fuel flow therethrough in which fuel absorbs heat normally only in said one section and upon a loss of oil pressure only in said other section without, however, bypassing either section, the heated oil flow path being through said first heat exchanger section and the heated compressor bleed air path being through said second heat exchanger section, and oil pressure responsive means controlling the flow of compressor bleed air to allow for its flow through said second heat exchanger section to be normally denied, said oil pressure responsive means making a flow of compressor bleed air through said second heat exchanger section dependent upon a loss of lubricating oil pressure.

2. A three fluid heat exchanger according to claim 1, said last named means responding directly to a drop in pressure in the path for heated oil through said one heat exchanger section.

3. A three fluid heat exchanger according to claim 1, said means providing for a continuing fuel flow defining a flow path in which portions of said one heat exchanger section are in a series relation to portions of said other heat exchanger section.

4. A three fluid heat exchanger according to claim 3, said heat exchanger sections each including a tube bundle and said tube bundles having orientations generally transversely of one another, said defined fuel flow path taking the fuel through the tubes of one bundle and over the tubes of the other bundle.

5. A three fluid heat exchanger according to claim 3, said defined fuel flow path taking the fuel through the heat exchanger in multiple passes at least certain passes including portions of both heat exchanger sections.

* * * * *